(12) United States Patent
Fujita et al.

(10) Patent No.: US 7,118,279 B2
(45) Date of Patent: Oct. 10, 2006

(54) SLIDING MEMBER AND METHOD OF MANUFACTURING THE SAME

(75) Inventors: Masahito Fujita, Inuyama (JP); Hideo Tsuji, Inuyama (JP); Takayuki Shibayama, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 103 days.

(21) Appl. No.: 10/817,533

(22) Filed: Apr. 2, 2004

(65) Prior Publication Data

US 2004/0197038 A1    Oct. 7, 2004

(30) Foreign Application Priority Data

Apr. 7, 2003    (JP)    ............... 2003-102886

(51) Int. Cl.
*F16C 17/00*    (2006.01)
(52) U.S. Cl. ...................... 384/285; 384/284
(58) Field of Classification Search ............... 384/284, 384/285, 286, 291, 292
See application file for complete search history.

(56) References Cited

U.S. PATENT DOCUMENTS 335,047 A * 1/1886 Torrey ......................... 384/285

1,045,908 A * 12/1912 Thacher ....................... 384/285

FOREIGN PATENT DOCUMENTS

| JP | 07-039808 | 2/1995 |
| JP | 11-213387 | 8/1999 |
| JP | 2000-035042 | 2/2000 |
| JP | 2002-103064 | 4/2002 |
| JP | 2002-106565 | 4/2002 |
| JP | A-2002-147459 | 5/2002 |

OTHER PUBLICATIONS

Japanese Office Action, Application No.: 2003-102886, dated Mar. 14, 2006.

* cited by examiner

*Primary Examiner*—Lenard A. Footland
(74) *Attorney, Agent, or Firm*—Rader, Fishman & Grauer PLLC

(57) ABSTRACT

The invention provides a sliding member including a plurality of holes formed on a sliding surface thereof, which sliding surface is adapted to slide on a mating member, at least one of the holes having an enlarged portion in at least a portion between an opening end and a bottom end thereof, the enlarged portion being larger than the opening end on the sliding surface.

8 Claims, 9 Drawing Sheets

FIG.1A
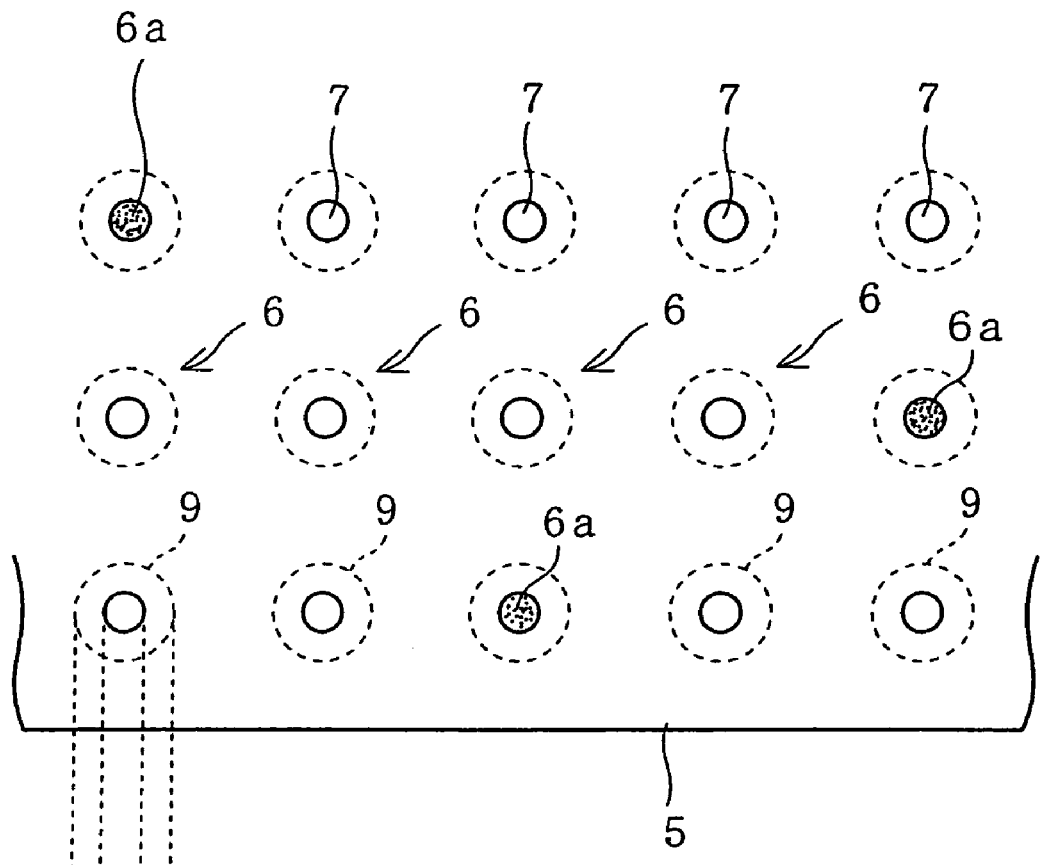
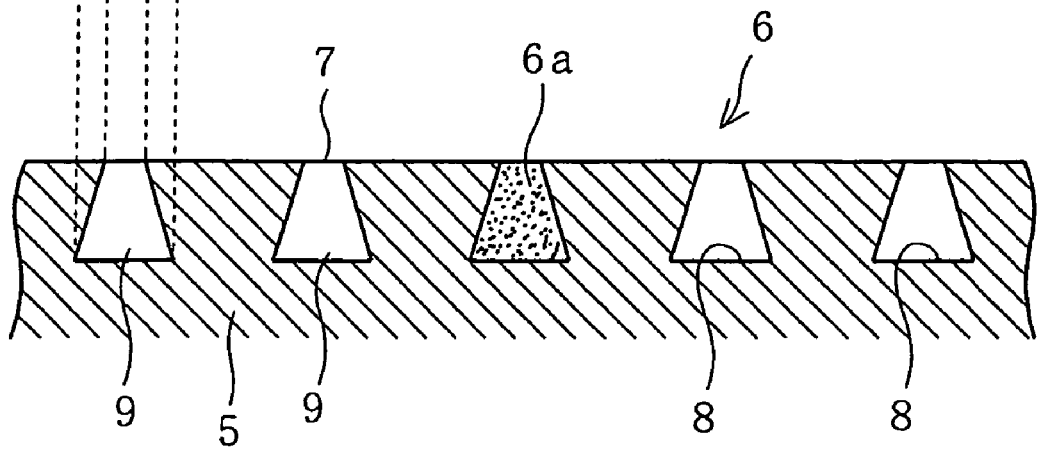
FIG.1B

SLIDING MEMBER AND METHOD OF MANUFACTURING THE SAME

CROSS-REFERENCE TO RELATED APPLICATIONS

This application claims priority based on Japanese Patent Application No. 2003-102886, filed Apr. 7, 2003, the entirety of which is incorporated herein by reference.

BACKGROUND OF THE INVENTION

The present invention relates to a sliding member used for a connecting rod for example, of which a sliding surface is subjected to a high surface load.

An engine used in an automobile, etc., converts up-and-down motion of a piston caused by explosion power of petroleum base fuel into rotational movement through a connecting rod and a crankshaft, to provide rotational driving power. The piston, connecting rod, crankshaft or the like are connected with each other through a shaft accommodated in a bearing, and a sliding surface of the bearing is repeatedly subjected to a rapidly increasing high load from the shaft as a mating member, during operation of the engine.

However, when the mating member and the bearing slide relative to each other in the state that the rapidly increasing high load is applied on the sliding surface, a lubricating oil film (or an oil film) retained on the sliding surface is broken to cause so-called partial metallic contact therebetween. Accordingly, there is a need of enhancing oil-film maintaining performance of the sliding surface of the bearing under such working environment, so as to prevent the lubricating oil from being flipped from the sliding surface even if the high load is applied thereto when the sliding surface slides on the mating member.

Although it is not directly related to the present invention, there has been proposed a sliding member in which an oil retaining property of a sliding surface is ensured by covering a bearing alloy layer with an overlay layer, and by blowing hard particles directly on the overlay layer to form fine holes on the overlay layer serving as the sliding surface, as shown in JP-A-2002-147459 (see paragraphs "0010" to "0034", and TABLE 4), for example.

However, in the case of the sliding member disclosed in JP-A-2002-147459, the holes are formed by the blowing hard particles having an average particle size of 20 to 100 μm directly against the overlay layer, so that each hole has a so-called bowl shape and further, there is a tendency that the holes are not independent from one another but are contiguous to one another. According to this structure, in the case that the sliding surface slides in a state that a mating member applies a relatively low load on the sliding surface, lubricating oil is retained on the sliding surface by the holes formed on the overlay layer, so that an oil film is formed between the mating member and the sliding member (or between sliding surfaces).

However, in the case of a sliding member used for supporting a connecting rod, for example, a rapidly increasing high load is often generated on a part of its sliding surface. Under such working condition, since each of the holes for retaining the lubricating oil of the sliding member disclosed in JP-A-2002-147459 has a bowl-shape, the lubricating oil is easily flipped from the respective holes and flows out from a hole to a hole by virtue of the holes being contiguous to one another, so that it becomes difficult to maintain the oil film between the sliding surfaces, after all.

BRIEF SUMMARY OF THE INVENTION

The invention has been made in view of the above situation, and the object thereof is to provide a sliding member capable of maintaining an oil film, even if a load acting on sliding surfaces is rapidly increased, by correspondingly increasing pressure of the oil film between the sliding surfaces.

According to a first aspect, the invention is characterized in that a sliding member includes a plurality of holes on a surface thereof, which surface slides relative to a mating member, and at least one of the holes is formed so that an enlarged portion, which is larger than an opening end thereof on the sliding surface, is provided at least a part of the hole between the opening end and a bottom end thereof. In this case, the enlarged portion is positioned below the opening end in a depth direction of the hole, and formed to have a relatively larger area than that of the opening end when comparing the areas of the enlarged portion and the opening end with each other. The comparison of the areas of the enlarged portion and the opening end is made in a state that surfaces of the enlarged portion and the opening end are made in parallel to each other. The number of the enlarged portions may be plural, and a shape thereof, and a position thereof in the depth direction of the hole are no matter, as long as the enlarged portion is positioned below the opening end.

According to the first aspect of the invention, the hole is configured such that its interior is large as compared with its opening end. Therefore, when a load applied on the sliding member by the mating member is increased, a surface load of the sliding surface is increased so that lubricating oil forming an oil film between sliding surfaces is intensely pressed to be confined in the hole. Then, the pressure of the lubricating oil present in the hole is increased, which causes a phenomenon that the increased pressure is transmitted to the lubricating oil forming the oil film. As a result, even when the load applied by the mating member is rapidly increased, the oil film is increased in pressure in accordance with the increased load, so that breakage of the oil film does not occur and a favorable lubricating state can be maintained.

Further, when the mating member slides, the lubricating oil reserved in the hole can be taken by the mating member to easily flow onto the sliding surface, so that the oil feeding property of the hole is not degraded. Also, the enlarged portion increases a volume of the hole to maintain the oil holding property of the hole.

According to a second aspect, the invention is characterized in that the ratio B/A (where "A" indicates the area of the opening end of the hole and "B" indicates the area of the enlarged portion) is in the range of 1.2 to 4.0.

The second aspect of the invention excludes a hole of which the opening end is extremely small as compared with the enlarged portion thereof, a cylindrical-shaped hole of which the opening end and the enlarged portion are substantially equal to each other in area, etc. Thus, it is possible to prevent the property of the hole for feeding the oil between sliding surfaces from being extremely degraded by virtue of the small opening end, and to prevent the oil film from being broken for the reason that oil-film pressure can not applied due to absence of the enlarged portion.

According to a third aspect, the invention is characterized in that the holes formed on the sliding surface include at least one hole which forms a cavity within there and has the enlarged portion, and at least one hole in which a solid lubricant is accommodated. Here, the solid lubricant includes lead, tin, bismuth, molybdenum disulfide, graphite, tungsten disulfide, PTFE, for example, and one or more solid lubricants selected from those may be accommodated in the hole. Further, the solid lubricant may be accommodated in a whole interior (volume) of the hole, or in a part of the hole. The shape of the hole receiving the solid lubricant is no matter. Also, the holes having a cavity therein, and the holes including the solid lubricant therein may be positioned on the sliding surface in a specific arrangement or not in such arrangement.

According to the third aspect of the invention, both of the holes having a cavity therein and the holes including the solid lubricant therein are present. Accordingly, the holes having a cavity hold the lubricating oil therein and feed the lubricating oil to the sliding surface in accordance with sliding movement of the mating member, and the holes including the solid lubricant therein feed the solid lubricant, as a substitute of the lubricating oil, to the sliding surface when the lubricating oil is little or not existent, so that the sliding surface is prevented from sliding in a partial intermetallic contact state due to the sliding movement of the mating member in its initial starting.

According to a fourth aspect, the invention is characterized in that the holes have an average diameter in the range of 1 to 100 µm at the opening end thereof on the sliding surface. The feature is based on the fact that the size of soft lubricating metal in a matrix of metal structure obtained by casting or sintering enables favorable lubrication in the above order. The invention artificially provides the distribution of lubricating particles in the natural world in a more appropriate range. Here, the average diameter is a diameter of the area at the opening end of each of the holes, which is calculated by dividing the total area of the opening ends of the holes by the total number of the holes.

According to the fourth aspect of the invention, the oil holding property of the holes formed on the sliding surface is not degraded by virtue of the holes being too small, or the oil-film pressure is not increased due to reduction of the area of the sliding surface by virtue of the holes being too large.

According to a fifth aspect, the invention is characterized in that the holes have a depth in the range of 5 to 70 µm at a deepest portion thereof.

According to the fifth aspect of the invention, the oil holding property of the holes formed on the sliding surface is not degraded by virtue of the holes being too shallow, or the strength of the sliding member is not weakened by virtue of the holes being too deep.

According to a sixth aspect, the invention is characterized in that a laser beam is bent by means of a mirror provided on an optical axis of the beams, and is condensed by means of a condensing lens so as to be irradiated on the sliding surface, the condensing lens being arranged so that a focus thereof is positioned on the sliding surface. In addition, the sliding member irradiated by the laser beam is capable of turning in a circumferential direction and moving in an axial direction. Also, when forming a plurality of holes on the sliding surface, the sliding member may be moved simultaneously in the circumferential direction and in the axial direction, or in either direction, and when forming only one hole, it is not necessary to move the sliding member.

According to the sixth aspect of the invention, the condensing lens is arranged in such a manner that the focus thereof is positioned on the sliding surface. Therefore, the laser beam having transmitted through the condensing lens is condensed to a minimum on the sliding surface and is expanded to form a conical configuration as the beam enters into (the inside of) the sliding member from the sliding surface, and the laser beam having expanded in a conical configuration inside the sliding member forms a hole until its energy per unit area reaches a certain value, so that an enlarged portion having a larger area than that of an opening end of the hole is formed therein.

According to a seventh aspect, the invention is characterized in that the laser beam has the power density of $10^6$ to $10^7$ W/cm$^2$ and are intermittently irradiated on the sliding surface in pulse width of $10^{-6}$ to $10^{-3}$ sec to form the holes. Here, the term "intermittently" means a manner in which driving and stoppage are repeated when the sliding member is moved, and duration of the driving and the stoppage is no matter.

According to the seventh aspect of the invention, it is possible to irradiate the laser beam in an optimum range for forming the holes on the sliding surface. Therefore, it is also possible to prevent the holes from overlapping with each other and from being made deformed.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 1A is a plan view showing a sliding surface of a first embodiment of the invention, and FIG. 1B is a cross sectional view of the sliding surface;

DETAILED DESCRIPTION OF THE INVENTION

Hereinafter, a first embodiment in which a sliding member according to the invention is applied to a bearing (referred below to as a crank-pin bearing) mounted on a large end constituting a connecting rod for an automobile will be described with reference to FIGS. 1 to 6.

Figure 2:
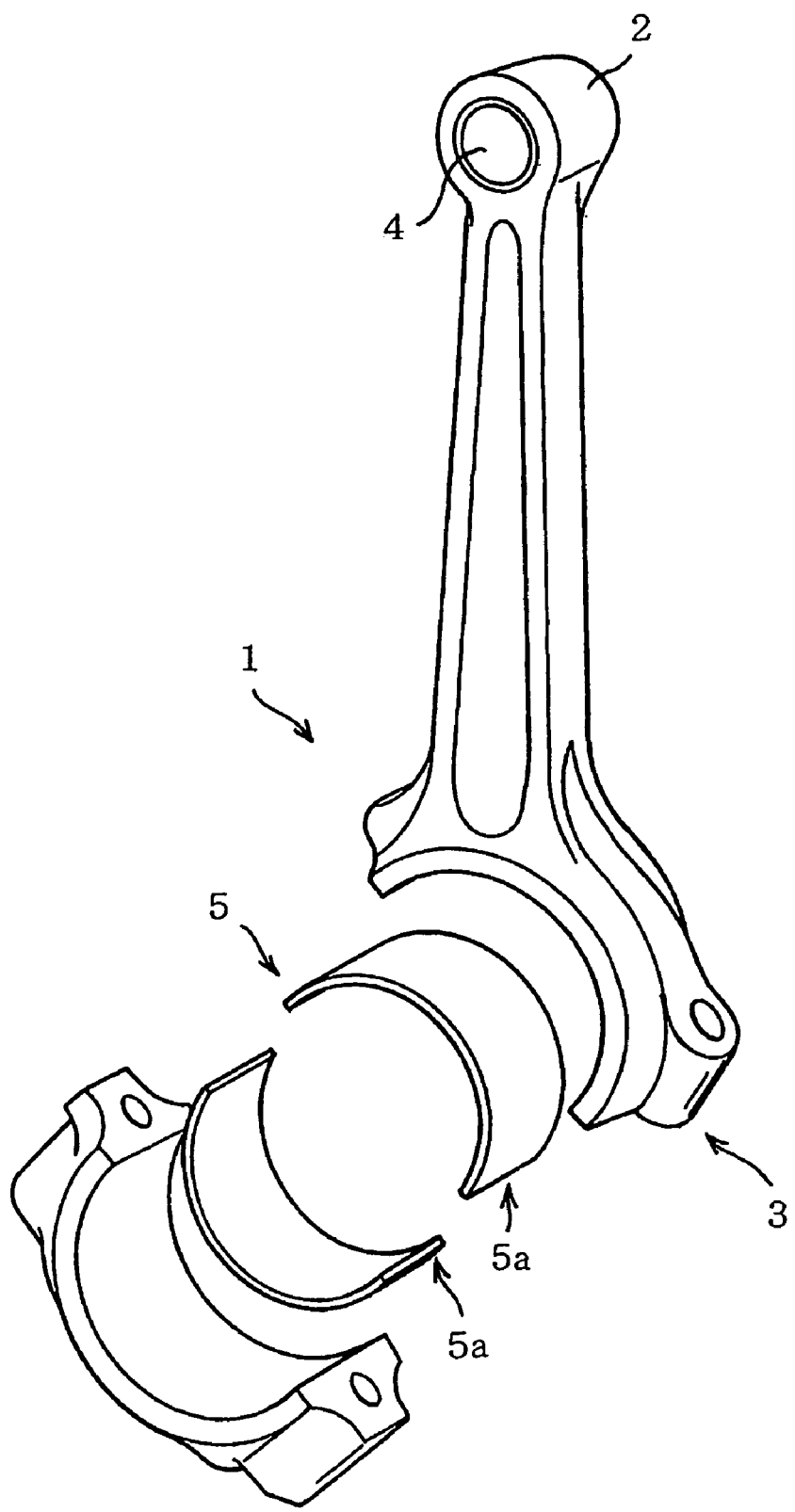
FIG. 2 is a perspective view showing a connecting rod.

As shown in FIG. 2, a connecting rod 1 includes both lengthwise ends, of which one is a small end 2 connected to a piston pin, and of which the other is a large end 3 connected to a crank pin. On the both ends 2 and 3, a piston-pin bearing 4 and a crank-pin bearing 5 are mounted for supporting the piston pin and the crank pin, respectively.

The crank-pin bearing 5 is constructed in a cylindrical shape by putting two semi-cylindrical shaped half bearings 5a together. The half bearings 5a are constituted by mounting bearing alloy on steel back metal, and a large number of holes 6 which are aligned lengthwise and crosswise are formed on a whole sliding surface (a surface of the bearing alloy) thereof, as shown in FIGS. 1A and 1B. Each of the holes 6 has an approximate frustum shape which enlarges in diameter from an opening end 7 on the sliding surface toward a bottom end 8 as shown in FIG. 1B showing a vertical sectional view of the sliding surface, so that the opening end 7 is substantially circular in shape as shown in FIG. 1A showing an enlarged plane view of the sliding surface, and a cross sectional shape of any plane which is in parallel to the sliding surface and is positioned between the opening end 7 and the bottom end 8 is also substantially circular in shape. A bottom portion (bottom end portion) of the hole 6 which gradually extends toward the bottom end 8 defines an enlarged portion 9 larger than the opening end 7 on the sliding surface.

Concretely, each of the holes 6 is sized to have a diameter on the order of 1 to 100 μm at the opening end 7. Since the hole 6 has a diameter of 1 to 100 μm at the opening end 7, it can be ensured to feed lubricating oil to the sliding surface. In the case that the opening end of the hole has a smaller diameter than the above diameter range, it can not be ensured to store a sufficient amount of oil. In the case that the hole is too larger, the sliding surface supporting the crank pin is reduced in area, so that the load of the sliding surface is increased, which constitutes a hindrance to forming an oil film.

Further, each hole 6 has a deepest portion having a depth on the order of 5 to 70 μm. Since the hole 6 has a deepest portion having a depth of 5 to 70 μm, it can be ensured to store a sufficient amount of oil in the hole 6. If the hole has a depth smaller than the above depth range, the lubricating-oil holding property cannot be achieved. If the hole has a depth larger than the above depth range, the load resistant property is degraded to be liable to occurrence of fatigue around the hole.

A space between the holes 6 on the sliding surface is sized so as not to connect the holes 6 to one another. For example, in the case of forming hole 6 of which an opening end 7 has a diameter of 20 μm, the enlarged portion 9 has a diameter of 40 μm, a deepest portion thereof has a depth of 70 μm, it is desired that the space between the holes 6 is on the order of 50 μm with a reference point of a center of each opening end 7, and the space is appropriately adjusted taking account of diameters of the opening end 7 and the enlarged portion 9, or an internal shape of the holes 6.

Figure 3:
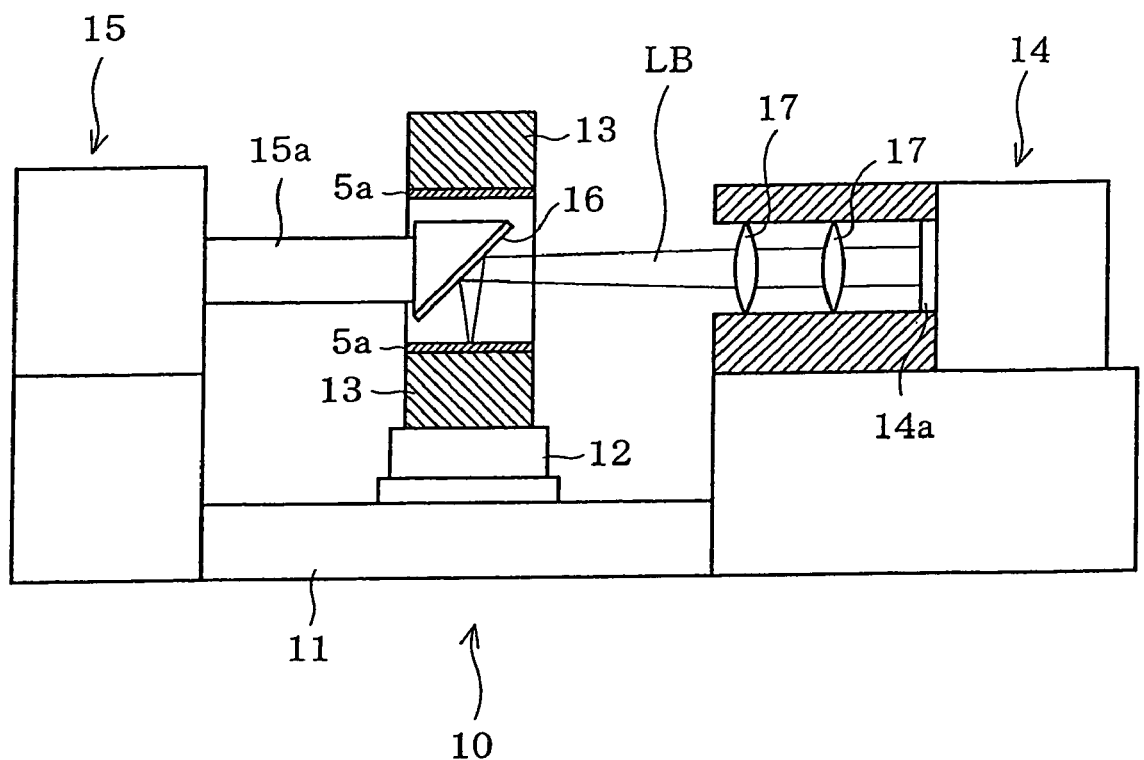
FIG. 3 is a cross sectional view showing a hole processing apparatus.

Next, a method of forming the holes 6 on the crank-pin bearing 5 will be described hereinafter. FIG. 3 shows a hole processing apparatus 10 and a slider 12 which is enabled by a servomotor (not shown) to reciprocate linearly and is arranged on a bed 11 of the apparatus. Further, a jig 13 for holding the crank-pin bearing 5 is rotatably mounted on the slider 12. The jig 13 is shaped to have a two-piece cylindrical shape as shown in FIGS. 4A and 4B, and rotationally driven by a servomotor (not shown).

Further, a laser transmitter 14 and a mirror bracket 15 are arranged on both sides of the bed 11. A mirror 16 is mounted to the mirror bracket 15 through an arm 15a so as to be directed obliquely downward, and when the slider 12 is moved leftward in the figure, the mirror 16 enters into the crank-pin bearing 5 mounted on the jig 13. The laser transmitter 14 includes a YAG laser or the like, and a laser beam LB can be radiated toward the mirror 16 from a radiation vent 14a of the laser transmitter 14 and reflected by the mirror 16 to be irradiated on the sliding surface of the crank-pin bearing 5 mounted on the jig 13.

For example, two condensing lenses 17 are provided ahead the radiation vent 14a of the laser transmitter 14, so that the laser beam LB radiated from the radiation vent 14a is condensed by the condensing lenses 17. The positions of the two condensing lenses 17 are determined in such a manner that a focus of a combined lens composed of the two condensing lenses 17 is positioned on the sliding surface of the crank-pin bearing 5 mounted on the jig 13.

Figure 4A:
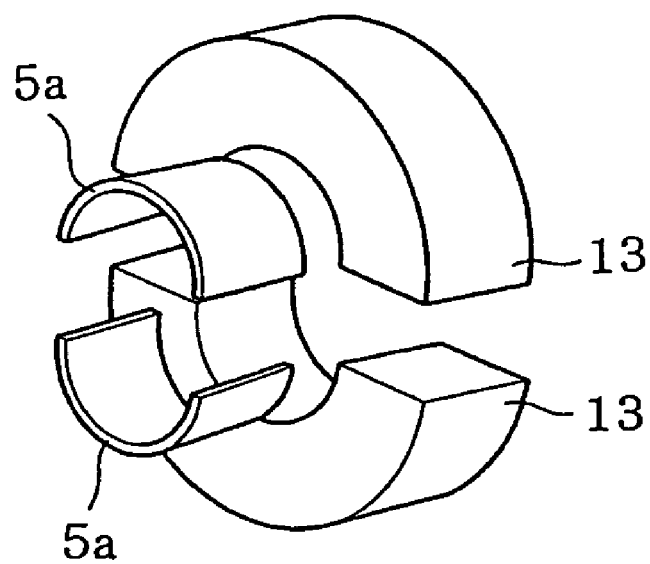
FIG. 4A is a perspective view showing a relationship between a jig and a half bearing.
Figure 4B:
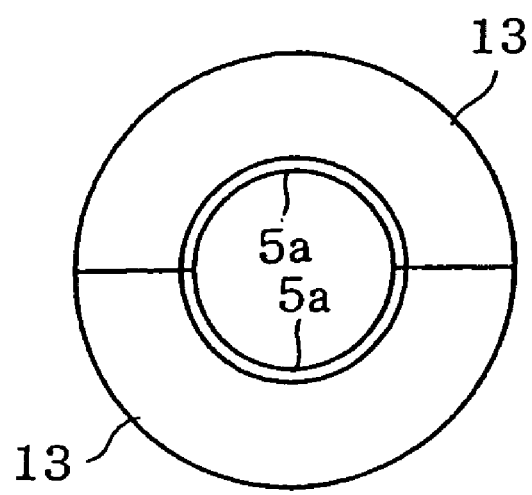
FIG. 4B is a front view of those.

In order to form the holes 6 on the sliding surface of the crank-pin bearing 5 by means of the hole processing apparatus 10, firstly, the two half bearings 5a are mounted on the jig 13 in a butted state as shown in FIGS. 4A and 4B. Then, when the laser transmitter 14 radiates laser beams LB, the laser beam LB is condensed by the condensing lenses 17 and reflected by the mirror 16 so as to be irradiated on the sliding surface of the crank-pin bearing 5.

Figure 5:
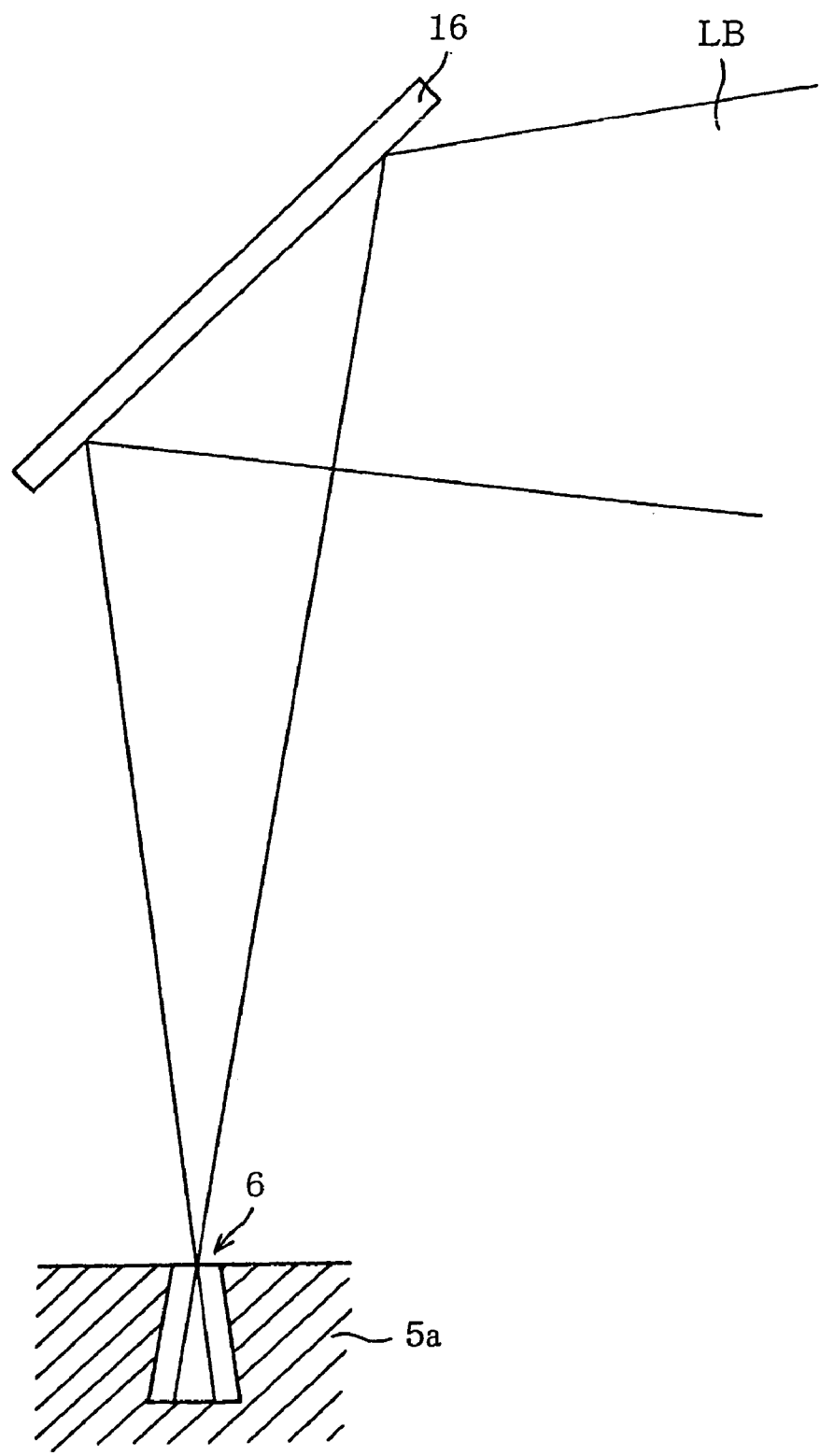
FIG. 5 is an enlarged view showing a hole processing manner.

At this time, the focus of the condensing lenses 17 is positioned on the sliding surface, whereby the laser beam LB becomes maximum in energy density on the sliding surface to form the hole 6 in a position on the sliding surface. When the hole 6 has been formed, the laser beam LB entering into the hole 6 expands as shown in FIG. 5, so that the hole 6 is expanded in width as it goes inward (to the bottom end portion) from the opening end 7 on the sliding surface.

Here, the laser beam LB is intermittently radiated from the laser transmitter 14 and has the power density of $10^6$ to $10^7$ W/cm$^2$ and a pulse width of $10^{-6}$ to $10^{-3}$ sec. In the case of the above ranges of the power density and the pulse width, a portion of the sliding surface irradiated by the laser beam LB evaporates instantaneously. However, if the power density and the pulse width of the laser beam LB exceed the above ranges, it is impossible to form an appropriate hole.

Figure 6:
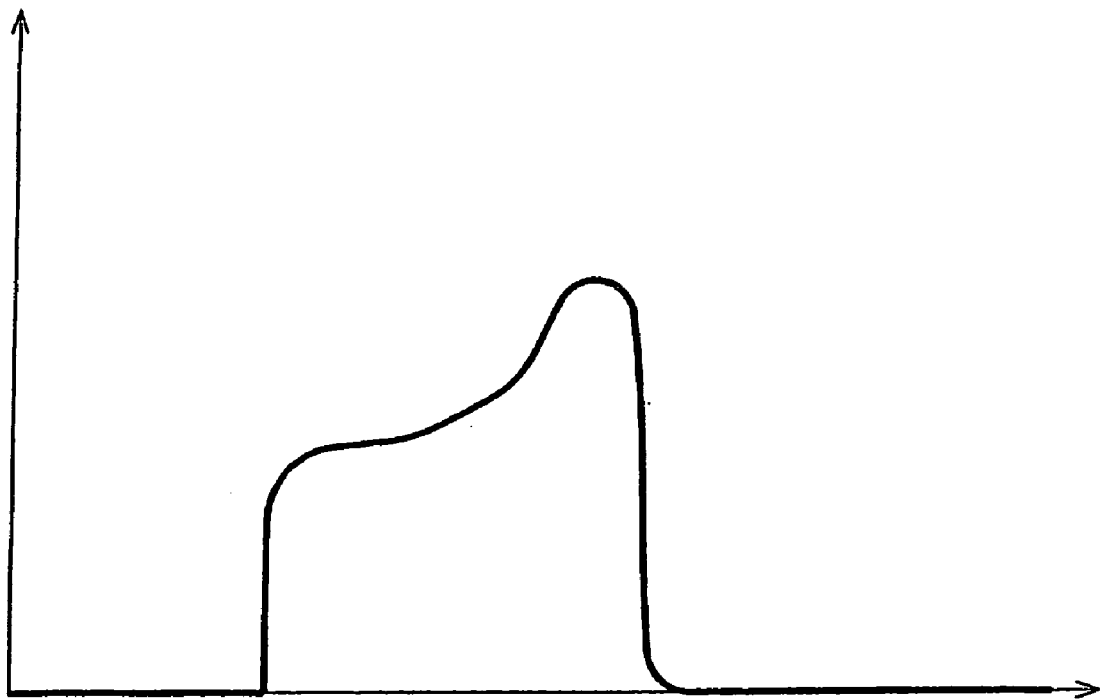
FIG. 6 is a graph showing a relationship between power and time in one pulse of a laser beam.

Further, in the present embodiment, the laser beam LB is variable in output power level in one pulse. In order to form the holes 6 as shown in FIG. 1 for example, the laser beam LB is radiated so that the power of the laser beam LB in one pulse is varied from a low level to a high level in time sequence as shown in FIG. 6 in which the time is indicated by the abscissa axis, and the output power is indicated by the ordinate axis. That is, the focus of the condensing lenses 17, in other words, the laser beam LB on the sliding surface of the half bearing half 5a is narrowed and contracted by the condensing lenses 17, so that the density thereof becomes high to easily form a hole on the sliding surface, however, the laser beam LB having passed through the focus expands in a cone configuration, whereby the density is gradually decreased, so that it becomes impossible to easily form the hole in the bearing beyond the sliding surface in a depth direction. Therefore, as the laser beam LB passes through the focus to expand to be decreased in density, the power of the laser beam LB is increased in time sequence so that the laser beam LB forms the hole 6 on the sliding surface and the enlarged portion 9 within the hole 6. Also, in addition to the above reason, the reason for varying the power of the laser beam LB from a low level to a high level in time sequence is that the enlarged portion 9 in the hole 6 is formed larger in area than that of the opening end 7 of the hole 6.

When the hole 6 has been formed in the above manner, the slider 12 is moved one pitch for forming a next hole 6. Then, when one row of holes 6 have been formed in a width direction of the crank-pin bearing 5, the jig 13 is turned one pitch for forming a next row of holes 6. In this manner, movements of the slider 12 and turning of the jig 13 are performed for the formation of the holes 6 in a state where the holes are aligned lengthwise and crosswise on the sliding surface. In addition, the order of the formation of the holes 6 may be reversed in the lengthwise and crosswise directions, on the sliding surface.

As shown in FIG. 1, a solid lubricant 6a is accommodated in at least one of the holes 6 as formed on the sliding surface in such a manner, and according to the present embodiment, the holes 6 accommodating therein the solid lubricant 6a, and the holes 6 having an interior cavity are arranged in an irregular manner. There are three methods of inserting the solid lubricant 6a in the holes 6, as described below.

Method 1: In the case of inserting one of lead, tin, bismuth, molybdenum disulfide, graphite, tungsten disulfide, and PTFE in the holes, such solid lubricant is firstly made into fine powders (of which the particle size is 5 μm or less) and formed into paste using engine oil as binder. Subsequently, the solid lubricant in the form of the paste is coated on the sliding surface of the sliding member heated to 100° C. to 150° C., whereby the lubricant is accommodated in the holes 6.

Method 2: In the case of inserting one of lead, tin, bismuth, molybdenum disulfide, graphite, tungsten disulfide, and PTFE in the holes, such solid lubricant is firstly made into fine powders (of which the particle size is 5 μm or less) and is dissolved in an organic solvent or formed into paste using dispersed thermosetting resin or thermoplastic resin as binder. Subsequently, the solid lubricant in the form of the paste is coated on the sliding surface of the sliding member heated to 100° C. to 150° C., whereby the lubricant is accommodated in the holes 6.

Method 3: In the case of inserting metallic solid lubricant such as one of lead, tin, bismuth and so on in the holes, the sliding surface of the sliding member is firstly plated with such metallic solid lubricant. Subsequently, the plated sliding surface is finished for removing the plating which remains on a portion (on the sliding surface) except an interior of the holes 6, whereby the solid lubricant is accommodated (or remains) only in the holes 6.

Next, the operation in the present embodiment will be described with respect to the crank-pin bearing 5.

In an operating situation of an engine, lubricating oil fed from a lubricating-oil pump (not shown) by pressure is supplied between sliding surfaces of the crank-pin bearing 5 and the crank pin, whereby lubrication between the sliding surfaces is achieved. Here, when the engine is increased in output, the crank-pin bearing 5 and the crank pin slide with high pressure acting therebetween. Therefore, the sliding surface of the crank-pin bearing 5 is increased in bearing surface load, and oil-film pressure between the sliding surfaces of the crank-pin bearing 5 and the crank pin is also increased, so that a part of the oil film is squeezed by the pressure to be made thin.

According to the first embodiment, however, since the enlarged portion 9 larger in area than that of the opening end 7 is formed at least partially between the opening end 7 and the bottom end 8 in the depth direction of the hole 6, so that even when the sliding surfaces slide relative to each other in a state that the high pressure acts on the sliding surfaces, the lubricating oil inside the hole 6 is hard to escape to the outside due to such high pressure, and therefore the oil film acted by the high pressure can be born by the whole inner surface of the hole 6. Therefore, even if the oil film of the lubricating oil between the sliding surfaces can be squeezed by the high pressure to be made thin, the oil film is not broken eventually, so that the oil-film maintaining capacity of the sliding surfaces is enhanced.

Further, since the hole 6 is increased in volume and also improved in its oil holding property by its enlarged portion 9, the lubricating oil kept in the hole 6 is taken by the sliding surface of the crankshaft and rapidly supplied between the sliding surfaces, for example, at the time of starting the engine, at which time the lubricating oil is delayed in being fed from the oil pump, so that it is possible to prevent seizure or the like caused by the sliding in a non-lubricated state.

Also, since the holes 6 on the sliding surface include a hole 6 in which the solid lubricant 6a is accommodated, the solid lubricant 6a in place of the lubricating oil is supplied between the sliding surfaces, for example, at the time of starting the engine or the like, at which time the lubricating oil is delayed in being fed from the oil pump, and the solid lubricant 6a is mixed in the lubricating oil to complement a smooth sliding in a state that the lubricating oil has been supplied. Further, in addition to the holes 6 accommodating therein the solid lubricant 6a, the holes 6 having an interior cavity are provided, so that the oil-film keeping capacity of the sliding surfaces is preserved. In this manner, both of the holes 6 accommodating therein the solid lubricant 6a and the holes having the interior cavity are formed in a mixed manner, whereby both of sliding in non-lubrication and maintenance of the oil film under the high pressure are satisfied.

Further, the holes 6 on the sliding surface are formed by means of the laser beam LB. Therefore, the uniform holes 6 having a desired shape can be formed, so that it is possible to prevent dispersion from being caused in the oil holding property of the holes 6 or the oil-film keeping capacity of the sliding surface.

Also, the laser beam LB is varied in power level. Therefore, a desired enlarged portion 9 can be formed inside the hole 6, in conformity to a location at which the sliding member is used, or to requested oil-film keeping capacity.

Also, the focus of the condensing lenses 17 is arranged on the sliding surface. Therefore, the laser beam LB is condensed to focus on the sliding surface and thus, the hole 6 can be easily formed on the sliding surface. Further, since the laser beam LB which has been incident inside the sliding surface is made in a cone-shape, the enlarged portion 9 can be formed inside the hole 6.

Also, an optical axis of the laser beam LB is changed by the mirror 16. Therefore, since the positional relationship between the laser transmitter 14 and the jig 13 can be selected freely, so that flexibility in use is increased in the case that the laser beam LB is used for forming the hole 6 on the sliding surface.

Also, the jig 13 securing the half bearings 5a is moved in a circumferential direction and an axial direction. Therefore, it is possible to appropriately change the forming position of the hole 6 on the sliding surface, and the forming speed of the hole 6, and the like.

Figure 7A:
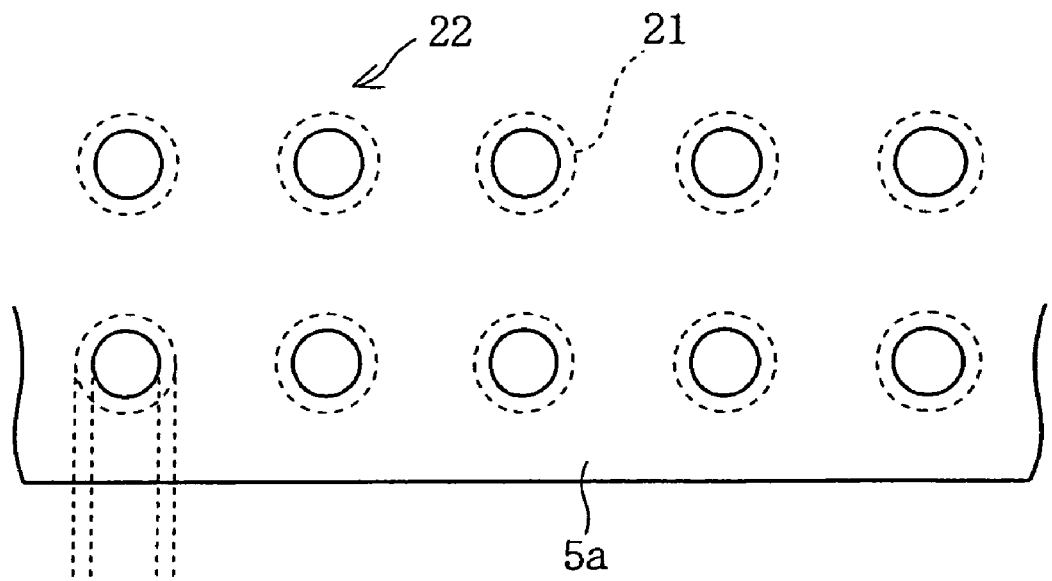
FIGS. 7A and 7B show a second embodiment, and correspond to FIGS. 1A and 1B, respectively.
Figure 7B:
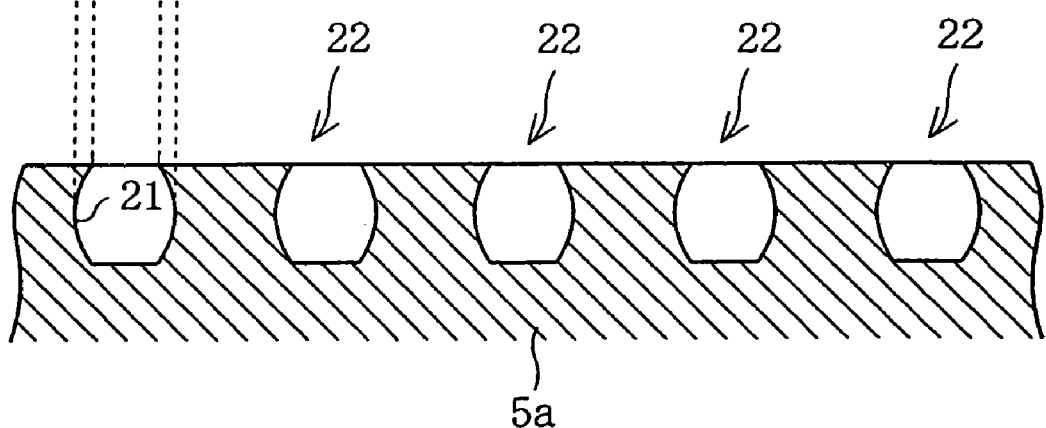

In the above first embodiment, although the enlarged portion 9 is located in a bottom portion (a bottom end 8) in a cross sectional shape of the hole 6 on the sliding surface, the invention is not limited to such structure, and an enlarged portion 21 may be located substantially in the center of the hole in a depth direction as shown in FIG. 7 showing a second embodiment of the invention for example, so that a so-called barrel-shaped hole 22 is provided, otherwise the shape of the hole may be modified into a round-type flask shape, or a shape of a beer bottle, or the like according to the purpose thereof.

Although the two condensing lenses 17 are used, the invention is not limited thereto, and one, or three or more condensing lenses may be used to adjust an aperture degree of the laser beam LB, for example. In addition, the number of mirrors 16 is also not limitative.

Also, although the holes 6 accommodating the solid lubricant 6*a* therein, and the holes 6 having an interior cavity of the holes 6 formed on the sliding surface are irregularly disposed, such arrangement is not limitative, and the both holes may be arranged regularly, for example.

Also, although the positions at which the holes 6 are formed are changed by moving the jig, such positional change is not limitative, and the arm 15*a* may be mechanically connected to a servomotor or the like to move the mirror 16 in a circumferential direction and an axial direction, or to move both of the jig 13 and the mirror 16 relative to each other to form the holes 16, for example.

Also, although the power of the laser beam LB is changed from a low level to a high level in time sequence, such change is not limitative, and the power may not be changed, the power may be changed plural times in one pulse, or the power may be changed through plural pulses.

Also, the plurality of holes 6 are formed on the sliding surface in an aligning state in lengthwise and crosswise directions. However, such an alignment state is not limitative and, the holes may be formed irregularly, in a non-aligning state, for example.

Figure 8:
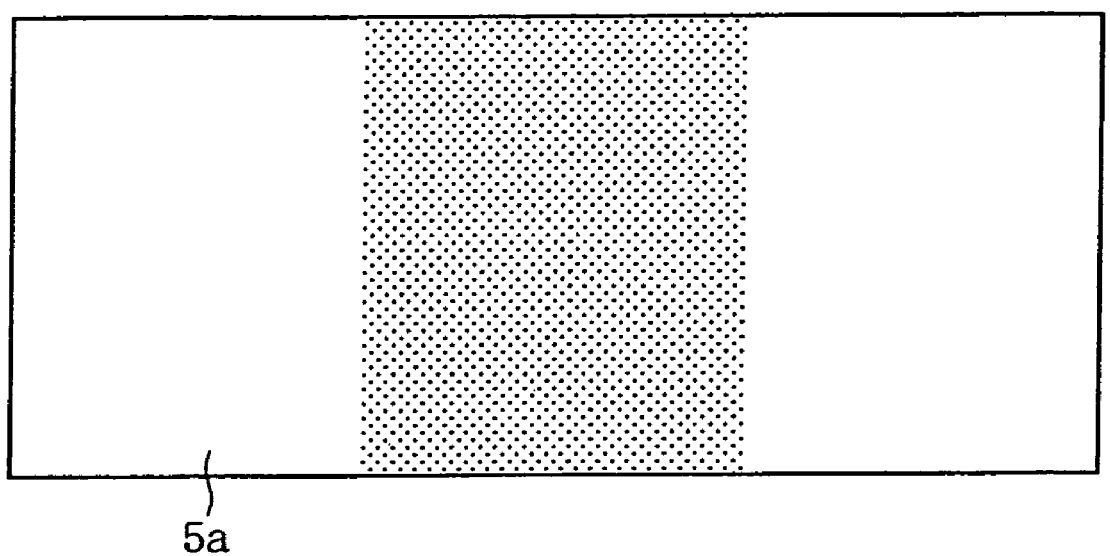
FIG. 8 is a plan view showing a third embodiment of the invention, and shows a hole forming area on a sliding surface of a sliding member.

Incidentally, while the holes 6 and 22 are formed on the entire sliding surface in the first and second embodiments, it is not always necessary to form the holes on the entire sliding surface, but the holes may be formed only in an area on which high pressure acts. In the case of a main bearing of an engine for example, the area on which the high pressure acts on the sliding surface is positioned substantially a center on a lower half bearing in a circumferential direction and accordingly, the holes 6 and 22 may be formed in a substantially central area in a circumferential direction of the half bearing 5*a* as shown in FIG. 8 showing a third embodiment of the invention (which corresponds to a half-tone dot meshing portion in the figure).

Figure 9:
FIG. 9 shows a fourth embodiment of the invention, and corresponds to FIG. 8.
Figure 10:
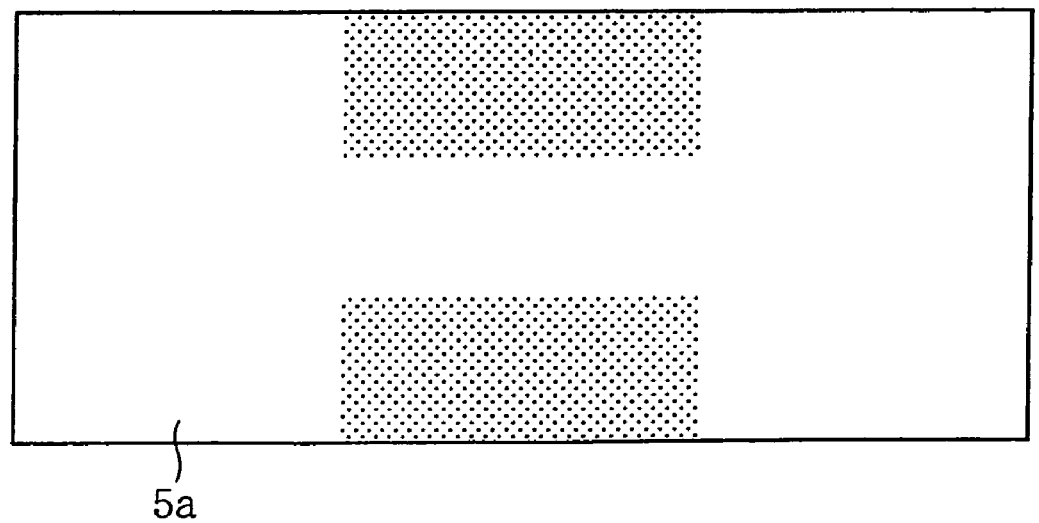
FIG. 10 shows a fifth embodiment of the invention, and corresponds to FIG. 8.

Further, in the case that both axial ends on a sliding surface are subjected to high pressure for the reason that a mating member is pressed on the both axial ends locally or with uneven contact, the holes 6 and 22 can be formed on both axial sides of the half bearing 5*a* as shown in FIG. 9 showing a fourth embodiment of the invention (which correspond to half-tone dot meshing areas in the figure). Furthermore, in the case that a large load acts partially on both axial sides of a half bearing in an axial direction, the holes 6 and 22 are formed in areas on which the large load acts on the both axial sides of the half bearing 5*a* as shown in FIG. 10 showing a fifth embodiment of the invention (which correspond to half-tone dot meshing areas in the figure).

In addition, the positions of the holes 6 formed on the sliding surface are not especially limitative in the third to fifth embodiments, but those may be changed appropriately in accordance with the use of the bearings. Also, all of the holes 6 formed on the sliding surface may be cavities, or accommodate the solid lubricant 6*a* therein.

Although the YAG laser is used in the first to fifth embodiments to form the holes 6 on the sliding surface, the embodiments are not limited thereto and a CO2 laser, semiconductor laser and the like may be used, for example.

Also, while the sliding member is applied to the crank-pin bearing 5, the application is not limited thereto, but may be applied to the piston-pin bearing 4 and may be applied further to a sliding member of a heavy duty machine or the like, in which the sliding member slides in a state that high pressure acts on a sliding surface.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A sliding member comprising a plurality of holes formed on a sliding surface thereof, which sliding surface is adapted to slide on a mating member, wherein at least one of said holes has an enlarged portion in at least a portion between an opening end and a bottom end thereof, the enlarged portion being larger than the opening end on the sliding surface, the ratio of B/A is in the range between 1.2 and 4.0. in which the symbol "A" indicates the area of the opening end, and the symbol "B." indicates the area of the enlarged portion, and the average diameter of the holes at the opening ends on the sliding surface is between 1 and 100 µm.

2. A sliding member comprising a plurality of holes formed on a sliding surface thereof, which sliding surface is adapted to slide on a mating member, wherein at least one of said holes has an enlarged portion in at least a portion between an opening end and a bottom end thereof, the enlarged portion being larger than the opening end on the sliding surface, the holes comprise at least one hole having the enlarged portion, of which the interior forms a cavity, and at least one hole accommodating a solid lubricant therein, and the average diameter of the holes at the opening ends on the sliding surface is between 1 and 100 µm.

3. A sliding member according to claim 1, wherein the holes comprise:

at least one hole having the enlarged portion, of which the interior forms a cavity; and at least one hole accommodating a solid lubricant therein.

4. A sliding member according to claim 3, wherein the depths of the holes at deepest portions thereof are between 5 and 70 µm.

5. A sliding member comprising a plurality of holes formed on a sliding surface thereof, which sliding surface is adapted to slide on a mating member, wherein at least one of said holes has an enlarged portion in at least a portion between an opening end and a bottom end thereof, the enlarged portion being larger than the opening end on the sliding surface, the ratio of B/A is in the range between 1.2 and 4.0, in which the symbol "A" indicates the area of the opening end, and the symbol "B"indicates the area of the enlarged portion, and the depths of the holes at deepest portions thereof are between 5 and 70 µm.

6. A sliding member according to claim 5, wherein the holes comprise:

at least one hole having the enlarged portion, of which the interior forms a cavity; and at least one hole accommodating a solid lubricant therein.

7. A sliding member comprising a plurality of holes formed on a sliding surface thereof, which sliding surface is adapted to slide on a mating member, wherein at least one of said holes has an enlarged portion in at least a portion between an opening end and a bottom end thereof, the enlarged portion being larger than the opening end on the sliding surface, the holes comprise at least one hole having an enlarged portion, of which the interior forms a cavity, and at least one hole accommodating a solid lubricant therein, and the depths of the holes at deepest portions thereof are between 5 and 70 μm.

8. A sliding member comprising a plurality of holes formed on a sliding surface thereof, which sliding surface is adapted to slide on a mating member, wherein at least one of said holes has an enlarged portion in at least a portion between an opening end and a bottom end thereof, the enlarged portion being larger than the opening end on the sliding surface, the average diameter of the holes at opening ends on the sliding surface is between 1 and 100 μm, and the depths of the holes at deepest portions thereof are between 5 and 70 μm.

* * * * *